US010602063B2

(12) United States Patent
Ho

(10) Patent No.: US 10,602,063 B2
(45) Date of Patent: Mar. 24, 2020

(54) ELECTRONIC APPARATUS, ELECTRONIC APPARATUS OPERATING METHOD, AND NON-TRANSITORY COMPUTER READABLE RECORDING MEDIUM

(71) Applicant: KYOCERA CORPORATION, Kyoto (JP)

(72) Inventor: Kiyotaka Ho, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 10 days.

(21) Appl. No.: 15/738,530

(22) PCT Filed: Jun. 21, 2016

(86) PCT No.: PCT/JP2016/068344
§ 371 (c)(1),
(2) Date: Dec. 20, 2017

(87) PCT Pub. No.: WO2016/208562
PCT Pub. Date: Dec. 29, 2016

(65) Prior Publication Data
US 2018/0227489 A1 Aug. 9, 2018

(30) Foreign Application Priority Data
Jun. 26, 2015 (JP) .................................. 2015-128777

(51) Int. Cl.
*G03B 19/22* (2006.01)
*H04N 5/232* (2006.01)
(Continued)

(52) U.S. Cl.
CPC ......... *H04N 5/23245* (2013.01); *G03B 13/02* (2013.01); *G03B 17/02* (2013.01);
(Continued)

(58) Field of Classification Search
CPC ........ G03B 13/02; G03B 17/02; G03B 17/18; G03B 19/22; H04N 5/2258;
(Continued)

(56) References Cited

U.S. PATENT DOCUMENTS 8,780,200 B2 * 7/2014 Yamamoto ......... H04N 5/23293
348/143
8,964,054 B2 * 2/2015 Jung ..................... H04N 5/232
348/211.11
(Continued)

FOREIGN PATENT DOCUMENTS

JP 2005-101874 A 4/2005
JP 2009-244369 A 10/2009
(Continued)

OTHER PUBLICATIONS

International Search Report/Written Opinion dated Sep. 20, 2016, in corresponding International Application No. PCT/JP2016/068344 with Statement of Relevance of Non-English References.

*Primary Examiner* — Ngoc Yen T Vu
(74) *Attorney, Agent, or Firm* — Duane Morris LLP

(57) ABSTRACT

An electronic apparatus includes first and second cameras which can be switched and used, a determination unit determining one of the first and second cameras as a camera being used, and a display displaying a shooting image of each of the first and second cameras. The first camera is a camera which can take an image at a wider angle than the second camera. The first camera has a first shooting range. The second camera has a second shooting range. When the display displays a first through image taken with the first camera as the camera being used, the display displays the second shooting range overlapping with the first through image.

12 Claims, 16 Drawing Sheets

(51) Int. Cl.
*H04N 5/225* (2006.01)
*G03B 17/02* (2006.01)
*G03B 17/18* (2006.01)
*G03B 13/02* (2006.01)

(52) U.S. Cl.
CPC .............. *G03B 17/18* (2013.01); *G03B 19/22* (2013.01); *H04N 5/2258* (2013.01); *H04N 5/23216* (2013.01); *H04N 5/23219* (2013.01); *H04N 5/23293* (2013.01); *H04N 5/23296* (2013.01); *H04N 5/232935* (2018.08); *H04N 5/232945* (2018.08)

(58) Field of Classification Search
CPC ......... H04N 5/23219; H04N 5/232935; H04N 5/232945; H04N 5/23293; H04N 5/23296; H04N 5/23216
See application file for complete search history.

(56) References Cited

U.S. PATENT DOCUMENTS

| | | | |
|---|---|---|---|
| 9,749,543 B2* | 8/2017 | Kim | H04N 5/23245 |
| 9,800,975 B1* | 10/2017 | Young | H04R 5/027 |

FOREIGN PATENT DOCUMENTS

| | | | | |
|---|---|---|---|---|
| JP | 4748023 B | 5/2011 | | |
| JP | 2012-49651 A | 3/2012 | | |
| JP | 2013-106289 A | 5/2013 | | |
| JP | 2016-032125 | * | 3/2016 | ............. H04N 5/232 |
| JP | 2016-32125 A | 3/2016 | | |

* cited by examiner

F I G . 4
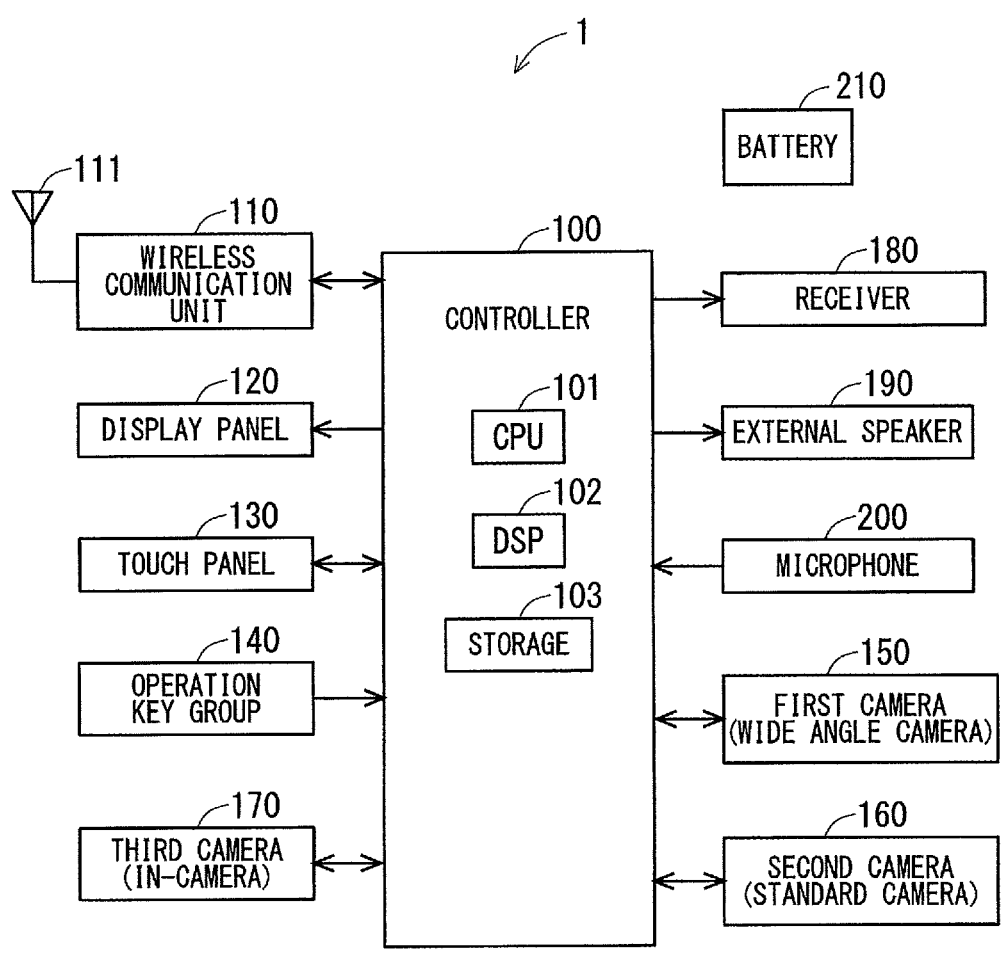

F I G . 5
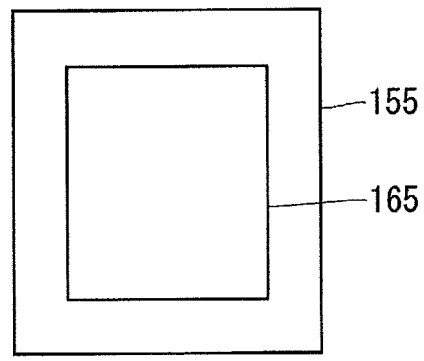

F I G . 2 0
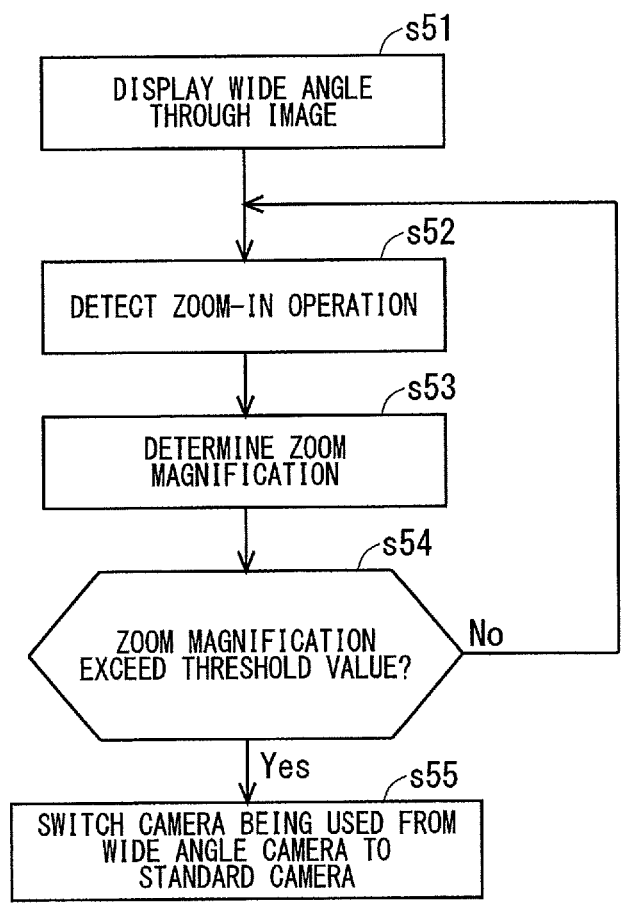

F I G . 2 2
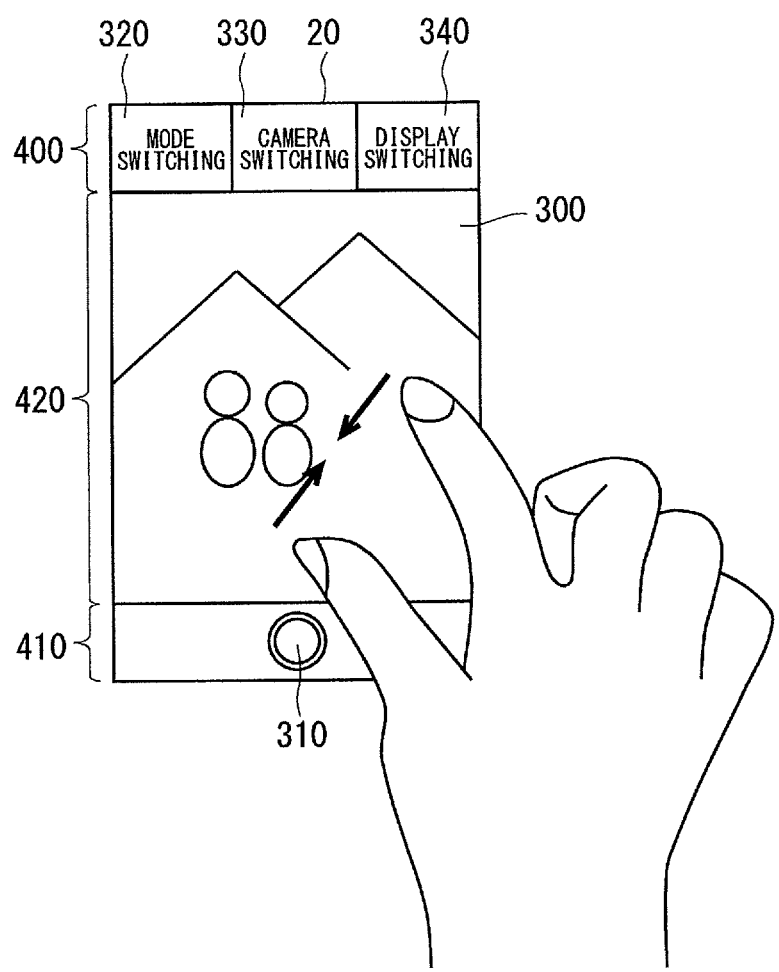

ELECTRONIC APPARATUS, ELECTRONIC APPARATUS OPERATING METHOD, AND NON-TRANSITORY COMPUTER READABLE RECORDING MEDIUM

CROSS-REFERENCE TO RELATED APPLICATIONS

The present invention claims priority to Japanese Patent Application No. 2015-128777 (filed Jun. 26, 2015), and a whole disclosure of this Japanese patent application is incorporated into the present invention for reference.

TECHNICAL FIELD

The present invention relates to an electronic apparatus.

BACKGROUND ART

Various techniques are conventionally suggested regarding electronic apparatuses having a camera.

An electronic apparatus, a method of operating the electronic apparatus, and a non-transitory computer-readable recording medium are disclosed. In one embodiment, the electronic apparatus includes first and second cameras which can be switched and used, at least one processor determining one of the first and second cameras as a camera being used, and a display displaying a shooting image of each of the first and second cameras. The first camera is a camera which can take an image at a wider angle than the second camera. The first camera has a first shooting range. The second camera has a second shooting range. When the display displays a first through image taken with the first camera as the camera being used, the display displays the second shooting range overlapping with the first through image.

In one embodiment, a method of operating an electronic apparatus is a method of operating an electronic apparatus which is a camera including first and second cameras being able to be switched and used, and the first camera can take an image at a wider angle than the second camera. The method of operating the electronic apparatus includes displaying a through image taken with the first camera and a shooting range of the second camera so that the shooting range overlaps with the through image.

In one embodiment, non-transitory computer-readable recording medium stores a control program. The control program control an electronic apparatus which is a camera including first and second cameras being able to be switched and used, the first camera can take an image at a wider angle than the second camera. The control program causes the electronic apparatus to display a through image taken with the first camera and a shooting range of the second camera so that the shooting range overlaps with the through image.

BRIEF DESCRIPTION OF DRAWINGS

FIG. 4 A block diagram showing an example of the configuration of the electronic apparatus.

FIG. 5 A drawing showing an example of a relationship between a wide angle shooting range and a standard shooting range.

FIG. 20 A flow chart showing an example of an operation of the electronic apparatus.

FIG. 22 A drawing showing an example of a user operation on the display screen.

DESCRIPTION OF EMBODIMENT(S)

<External Appearance of Electronic Apparatus>

Figure 1:
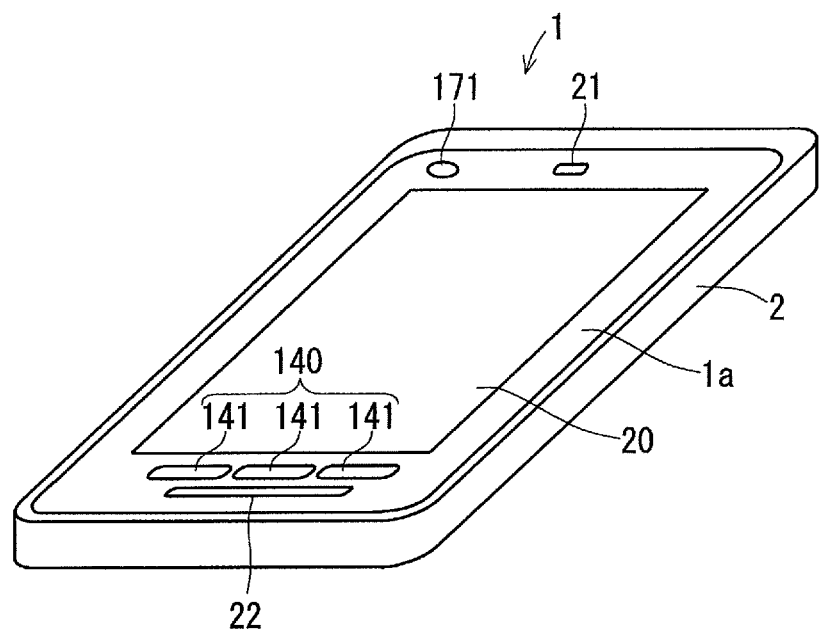
FIG. 1 A perspective view showing an example of an external appearance of an electronic apparatus.
Figure 2:
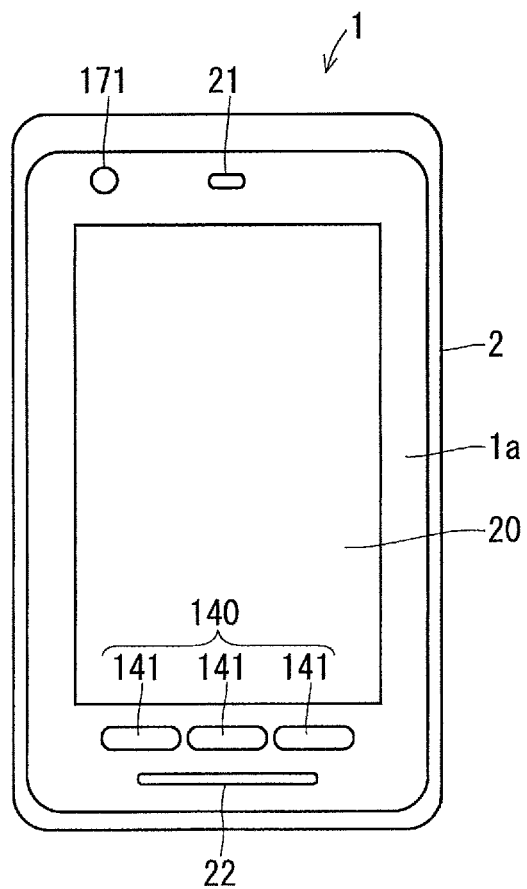
FIG. 2 A front view showing an example of the external appearance of the electronic apparatus.
Figure 3:
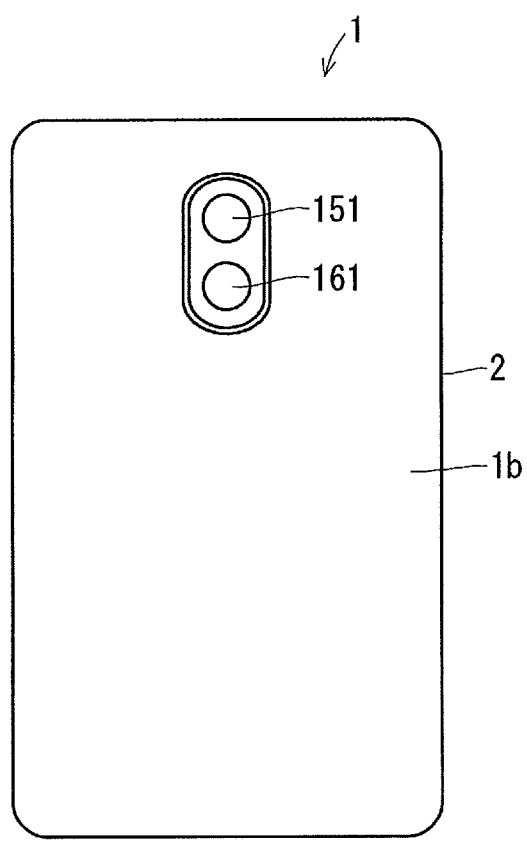
FIG. 3 A back view showing an example of the external appearance of the electronic apparatus.

FIGS. 1, 2, and 3 are a perspective view, a front view, and a back view showing an example of an external appearance of an electronic apparatus 1, respectively. The electronic apparatus 1 is a mobile phone such as a smartphone, for example. As shown in FIGS. 1 to 3, the electronic apparatus 1 includes an apparatus case 2 having a plate shape substantially rectangular in a plan view. A front surface 1a of the electronic apparatus 1, that is to say, a front surface of the apparatus case 2 is provided with a display screen (display area) 20 on which various types of information such as characters, symbols, and diagrams are displayed. A touch panel 130, which will be described below, is located on a rear surface of the display screen 20. The user can accordingly provide various types of information to the electronic apparatus 1 by operating the display screen 20 on the front surface 1a of the electronic apparatus 1 with his/her finger, for example. The user can also provide the various types of information to the electronic apparatus 1 by operating the display screen 20 with a pen for a static touch panel such as a stylus pen, for example, instead of an operator such as his/her finger.

Provided in an upper-side end portion of the apparatus case 2 is a receiver hole 21. A lens 171 included in a third camera 170, which will be described below, can be visually recognized from an upper-side end portion of the front surface of the apparatus case 2. As shown in FIG. 3, lenses 151 and 161 included in a first camera 150 and a second camera 160, which will be described below, respectively, can be visually recognized from a back surface 1b of the electronic apparatus 1, that is to say, from the back surface of the apparatus case 2.

Provided in a lower-side end portion of the apparatus case 2 is a speaker hole 22. Provided inside the apparatus case 2 is an operation key group 140 including a plurality of operation keys 141. Each operation key 141 is a press button, for example, and its surface is exposed from a lower-side end portion of the front surface of the apparatus case 2. The user can provide instructions to the electronic apparatus 1 by pressing the operation key 141 with his/her finger, for example. The plurality of operation keys 141 include, for example, a home key, a back key, and a history key. The home key is an operation key to cause the display screen 20 to display a home screen. The back key is an operation key to switch a display of the display screen 20 to a preceding one. The history key is an operation key to cause the display screen 20 to display a history of an application activated in the electronic apparatus 1.

<Electronic Configuration of Electronic Apparatus>

FIG. 4 is a block diagram mainly showing an electronic configuration of the electronic apparatus 1. As shown in FIG. 4, the electronic apparatus 1 includes a controller 100, a wireless communication unit 110, a display panel 120, the touch panel 130, the operation key group 140, a first camera 150, a second camera 160, and a third camera 170. The electronic apparatus 1 further includes a receiver 180, an external speaker 190, a microphone 200, and a battery 210. The apparatus case 2 houses each of these components provided in the electronic apparatus 1.

The controller 100 is a control circuit including a processor such as a CPU (Central Processing Unit) 101 and a DSP (Digital Signal Processor) 102, and a storage 103, for example. The controller 100 controls other components of the electronic apparatus 1 to be able to collectively manage the operation of the electronic apparatus 1.

The storage 103 includes a non-transitory recording medium readable by the controller 100 (a CPU 101 and a DSP 102) such as a ROM (Read Only Memory) and a RAM (Random Access Memory). The storage 103 stores various programs to control the operation of the electronic apparatus 1, specifically, the operation of each component of the wireless communication unit 110 and the display panel 120, for example, included in the electronic apparatus 1. The CPU 101 and the DSP 102 perform the various programs in the storage 103 to achieve various functions of the controller 100. The storage 103 may include a non-transitory computer-readable recording medium other than the ROM and the RAM. The storage 103 may include, for example, a compact hard disk drive and a SSD (Solid State Drive). All functions or a part of the functions of the controller 100 may be made up of a hardware circuit which does not need software to achieve the function.

The storage 103 stores various applications (application programs). The storage 103 stores, for example, a call application to perform a voice call using a call function, a browser to display a website, and a mail application to generate, browse, transmit, and receive an e-mail. The storage 103 stores a camera application to take an object using the first camera 150, the second camera 160, and the third camera 170, a map display application to display a map, a game application to perform a game such as a puzzle game in the electronic apparatus 1, and a music reproduction control application to control the reproduction of music data stored in the storage 103, for example.

The wireless communication unit 110 has an antenna 111. The wireless communication unit 110 can receive, through the antenna 111, a signal from a mobile phone different from the electronic apparatus 1 or a signal from a communication device such as a web server connected to Internet, for example, via a base station. The wireless communication unit 110 can perform amplification processing and down-conversion processing on the signal received by the antenna 111 and then outputs a resultant signal to the controller 100. The controller 100 can perform modulation processing, for example, on the received signal that has been input, to thereby obtain a sound signal indicative of voice or music contained in the received signal, for example. The wireless communication unit 110 can also perform up-conversion processing and amplification processing on a transmission signal including the sound signal that has been generated by the controller 100, to thereby wirelessly transmit the processed transmission signal from the antenna 111. The transmission signal from the antenna 111 is received, via the base station, by a mobile phone different from the electronic apparatus 1 or a communication device connected to the Internet.

The display panel 120 is, for example, a liquid crystal display panel or an organic EL panel. The display panel 120 can display various types of information such as characters, symbols, and graphics under control of the controller 100. The display panel 120 is disposed to face the display screen 20 in the apparatus case 2. The display screen 20 displays information displayed by the display panel 120. The display screen 20 and the display panel 120 constitute a display which displays information to indicate the information to the user.

The touch panel 130 can detect an operation performed by the operator such as the finger on the display screen 20. The touch panel 130 is, for example, a projected capacitive touch panel, and is disposed on the rear surface of the display screen 20. When the user operates the display screen 20 with the operator such as his/her finger, an electrical signal corresponding to the operation is input from the touch panel 130 to the controller 100. The controller 100 can specify contents of the operation performed on the display screen 20 based on the electrical signal input from the touch panel 130, thereby performing a processing in accordance with the contents.

When the user presses each operation key 141 of the operation key group 140, the operation key 141 outputs to the controller 100 an operation signal indicating that the operation key 141 has been operated. Accordingly, the controller 100 can determine whether or not the operation key 141 has been operated for each operation key 141. The controller 100 performs the processing corresponding to the operation key 141 that has been operated.

The microphone 200 can convert the sound being input from the outside of the electronic apparatus 1 into an electrical sound signal and then output the electrical sound signal to the controller 100. The sound from the outside of the electronic apparatus 1 is taken inside the electronic apparatus 1 through a microphone hole provided in the surface of the apparatus case 2 to be input to the microphone 200. The microphone hole is provided in a side surface (a bottom surface) in a lower side of the apparatus case 2, for example.

The external speaker 190 is, for example, a dynamic speaker. The external speaker 190 can convert an electrical sound signal from the controller 100 into sound and then output the sound. The sound being output from the external speaker 190 is output from the speaker hole 22 to the outside. The sound being output from the speaker hole 22 can be heard in a place apart from the electronic apparatus 1.

The receiver 180 can output the received sound. The receiver 180 is made up of, for example, a dynamic speaker. The receiver 180 can convert an electrical sound signal from the controller 100 into sound and then output the sound. The sound being output from the receiver 180 is output from the receiver hole 21 to the outside. A volume of the sound being output through the receiver hole 21 is set to be smaller than a volume of the sound being output through the speaker hole 22. It is also applicable to provide a vibration element such as a piezoelectric vibration element, which causes a front surface portion of the apparatus case 2 to vibrate, instead of the receiver 180 to transmit the sound from the front surface portion to the user.

The battery 210 can output a power source of the electronic apparatus 1. The battery 210 is, for example, a rechargeable battery. A power source being output from the battery 210 is supplied to various circuits such as the controller 100 and the wireless communication unit 110 of the electronic apparatus 1.

The first camera 150 comprises the lens 151 and an image sensor, for example. The second camera 160 comprises the lens 161 and an image sensor, for example. The third camera 170 comprises the lens 171 and an image sensor, for example. Each of the first camera 150, the second camera 160, and the third camera 170 takes an image of an object under control of the controller 100, generates a still image or a video of the object, and then outputs the still image or the video to the controller 100. At least one of the first camera 150, the second camera 160, and the third camera 170 may take the image of the object for one line, and output the image for the one line to the controller 100 every time the image for the one line is generated. In the above case, the controller 100 generates the still image or the video based on the images for the plurality of lines.

The lens 171 of the third camera 170 can be visually recognized from the front surface of the electronic apparatus 1. Accordingly, the third camera 170 can take an image of an object located on a front surface side of the electronic apparatus 1 (a display screen 20 side). Such a third camera 170 is referred to as an "in-camera" in some cases. Hereinafter, the third camera 170 is referred to as "the in-camera 170" in some cases.

The lens 151 of the first camera 150 can be visually recognized from the back surface of the electronic apparatus 1. Accordingly, the first camera 150 can take an image of an object located on the back surface side of the electronic apparatus 1. Similarly, the lens 161 of the second camera 160 can be visually recognized from the back surface of the electronic apparatus 1. Accordingly, the second camera 160 can take an image of an object located on the back surface side of the electronic apparatus 1. Each of such a first camera 150 and second camera 160 is referred to as an "out-camera" in some cases.

The first camera 150 is a camera which can take an image at a wider angle than the second camera 160. Herein, when the lenses 151 and 161 are both single focus lenses with fixed field angles, "the camera which can take the image at the wider angle" indicates that the fixed field angle of the first camera 150 is larger than that of the second camera 160. When the lens 151 is a single focus lens and the lens 161 is a zoom lens with a variable field angle, "the camera which can take the image at the wider angle" indicates that the fixed field angle of the first camera 150 is larger than a maximum value of the variable field angle of the second camera 160. When the lens 151 is a zoom lens and the lens 161 is a single focus lens, "the camera which can take the image at the wider angle" indicates that a maximum value of a variable field angle of the first camera 150 is larger than the fixed field angle of the second camera 160. When the lenses 151 and 161 are both zoom lenses, "the camera which can take the image at the wider angle" indicates that a maximum value of a variable field angle of the first camera 150 is larger than a maximum value of a variable field angle of the second camera 160.

The first camera 150 is referred to as "the wide angle camera 150" and the second camera 160 is referred to as "the standard camera 160" hereinafter for convenience of description. In the present example, each of the lens 151 of the wide angle camera 150, the lens 161 of the standard camera 160, and the lens 171 of the in-camera 170 is the single focus lens. At least one of the lenses 151, 161, and 171 may be the zoom lens.

The electronic apparatus 1 has a zoom function for each of the wide angle camera 150, the standard camera 160, and the in-camera 170. That is to say, the electronic apparatus 1 has a wide angle camera zoom function for zooming in an object whose image is taken with the wide angle camera 150, a standard camera zoom function for zooming in an object whose image is taken with the standard camera 160, and an in-camera zoom function for zooming in an object whose image is taken with the in-camera 170. Since each of the lenses 151, 161, and 171 in the present example is the single focus lens, each of the wide angle camera zoom function, standard camera zoom function, and in-camera zoom function is a digital zoom function. At least one of the wide angle camera zoom function, standard camera zoom function, and in-camera zoom function may be an optical zoom function.

When a zoom magnification of each of the wide angle camera 150 and standard camera 160 is "one", a shooting range of the wide angle camera 150 (referred to as "the wide angle shooting range" hereinafter) is wider than the shooting range of the standard camera 160 (referred to as "the standard shooting range" hereinafter) and includes the shooting range of the standard camera 160. FIG. 5 is a drawing schematically showing an example of a relationship between a wide angle shooting range 155 and a standard shooting range 165 when the zoom magnification of each of the wide angle camera 150 and standard camera 150 is "one".

<Operation of Electronic Apparatus During Execution of Camera Application>

Figure 6:
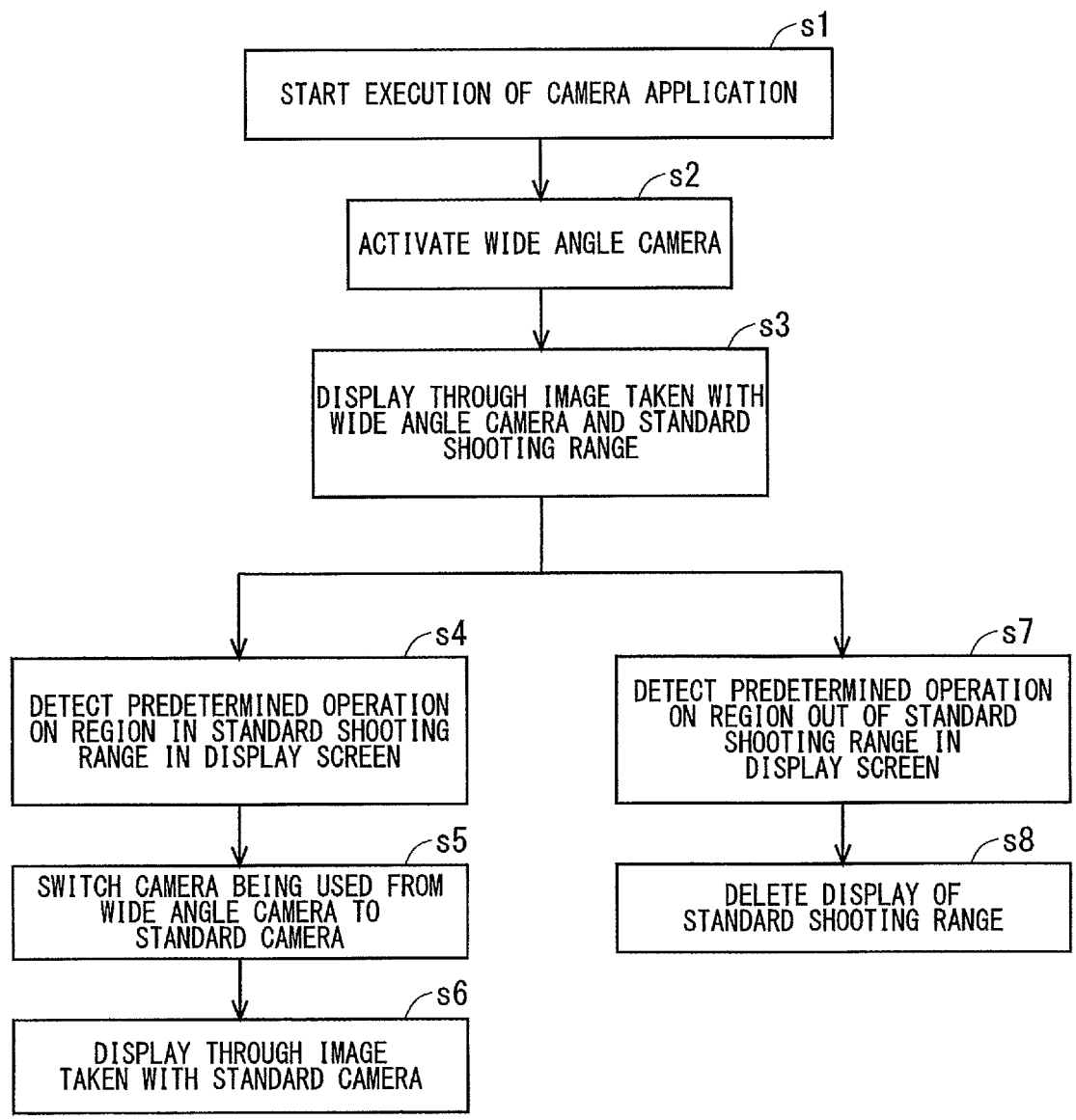
FIG. 6 A flow chart showing an example of an operation of the electronic apparatus.

FIG. 6 is a flow chart showing an example of an operation of the electronic apparatus 1 during the execution of the camera application. When a predetermined operation is performed on the display screen 20, the controller 100 starts, in Step s1, an execution of the camera application stored in the storage 103, as shown in FIG. 6. When the camera application is no executed, the wide angle camera 150, the standard camera 160, and the in-camera 170 do not operate. That is to say, the power source is not supplied to the wide angle camera 150, the standard camera 160, and the in-camera 170. When the controller 100 starts the execution of the camera application, the controller 100 supplies the power source only to the wide angle camera 150 out of the wide angle camera 150, standard camera 160, and in-camera 170, thereby activating the wide angle camera 150 in Step s2. The wide angle camera 150 thereby becomes a camera being used. In the present example, when a camera is the camera being used, the power source is not supplied to the other cameras. The activation of the camera indicates that the power supply to the camera is started. The controller 100 controls the power supply to the wide angle camera 150, the standard camera 160, and the in-camera 170.

After Step s2, the controller 100 causes the display panel 120 to display a through image (also referred to as "a wide angle through image" hereinafter) taken with the wide angle camera 150 in Step s3. That is to say, the controller 100 causes the display panel 120 to display, in real time, the shooting images which are sequentially taken with the wide angle camera 150 at a predetermined frame rate. At this time, the controller 100 causes the display panel 120 to display the standard shooting range to overlap with the wide angle through image. Accordingly, the wide angle through image and the standard shooting range are displayed on the display screen 20. The controller 100 stores the wide angle through image, which is obtained by the wide angle camera 150, is stored in a volatile memory in the storage 103.

Figure 7:
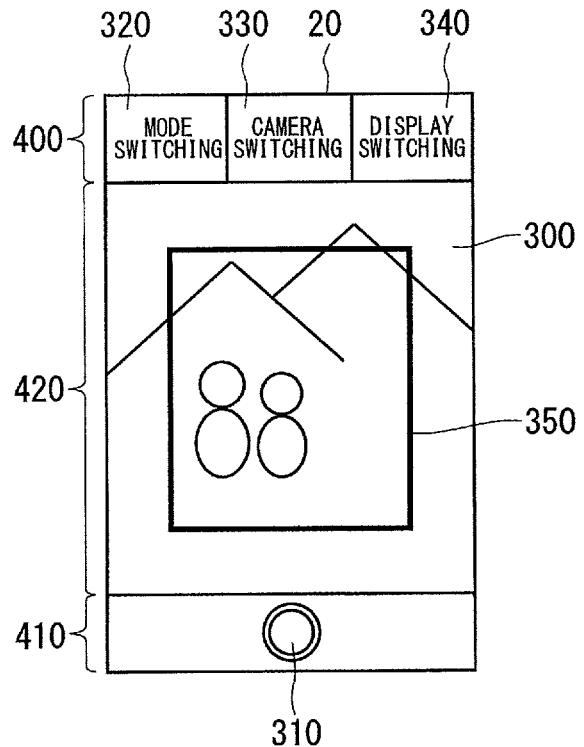
FIG. 7 A drawing showing an example of a display of a display screen.

FIG. 7 is a drawing showing an example of a display of the display screen 20 during the execution of camera application. FIG. 7 shows the display screen 20 displaying a wide angle through image 300 and the standard shooting range.

As shown in FIG. 7, the wide angle through image 300 is displayed in a central region 420 (a region except for an upper-side end portion 400 and a lower-side end portion 410) of the display screen 20. That is to say, the central region 420 displays an object in the wide angle shooting range. Then, a standard shooting range frame 350 indicating an outline of the standard shooting range is displayed to overlap with the wide angle through image 300. A partial image in the standard shooting range frame 350 in the wide angle through image 300 is an image indicating an object in the standard shooting range.

As described above, when the wide angle camera 150 is used, the standard shooting range of the standard camera 160 is displayed to overlap with the through image 300 taken with the wide angle camera 150. Accordingly, the user can confirm both the object whose image is taken with the wide angle camera 150 and the object whose image is taken with the standard camera 160 in one screen.

During the execution of the camera application, as shown in FIG. 7, an operation button 310 is displayed in the lower-side end portion 410 of the display screen 20. A mode switching button 320, a camera switching button 330, and a display switching button 340 are displayed in the upper-side end portion 400 of the display screen 20.

The mode switching button 320 is an operation button for switching the shooting mode of the electronic apparatus 1. In a case where the shooting mode of the electronic apparatus 1 is a still image shooting mode, when the touch panel 130 detects a predetermined operation (e.g., a tap operation) on the mode switching button 320, the controller 100 switches the shooting mode of the electronic apparatus 1 from the still imaging shooting mode to a video shooting mode. In a case where the shooting mode of the electronic apparatus 1 is the video shooting mode, when the touch panel 130 detects a predetermined operation on the mode switching button 320, the controller 100 switches the shooting mode of the electronic apparatus 1 from the video shooting mode to the still image shooting mode.

The camera switching button 320 is an operation button for switching a camera being used. In a case where the camera being used is the wide angle camera 150, when the touch panel 130 detects a predetermined operation (e.g., a tap operation) on the camera switching button 320, the controller 100 switches the camera being used from the wide angle camera 150 to, for example, the standard camera 160. In a case where the camera being used is the standard camera 160, when the touch panel 130 detects a predetermined operation on the camera switching button 320, the controller 100 switches the camera being used from the standard camera 160 to the in-camera 170. In a case where the camera being used is the in-camera 170, when the touch panel 130 detects a predetermined operation on the camera switching button 320, the controller 100 switches the camera being used from the in-camera 170 to the wide angle camera 150.

The display switching button 340 is an operation button for switching display/non-display of the standard shooting range. The display switching button 340 is displayed only when the display screen 20 displays the wide angle through image 300, for example. In a case where the display screen 20 displays the standard shooting range frame 350, when the touch panel 130 detects a predetermined operation (e.g., a tap operation) on the display switching button 340, the controller 100 causes the display panel 120 to delete the display of the standard shooting range frame 350. In a case where the display screen 20 does not display the standard shooting range frame 350, when the touch panel 130 detects a predetermined operation on the display switching button 340, the controller 100 causes the display panel 120 to display the standard shooting range frame 350.

In the case where the shooting mode of the electronic apparatus 1 is the still image shooting mode, the operation button 310 functions as a shutter button. In the meanwhile, in the case where the shooting mode of the electronic apparatus 1 is the video shooting mode, the operation button 310 functions as an operation button to start and stop shooting the video. In the case where the shooting mode is the still image shooting mode, when the touch panel 130 detects a predetermined operation (e.g., a tap operation) on the operation button 310, the controller 100 stores a still image, which is taken with the camera being used (the wide angle camera 150 in the example in FIG. 7) at the time of operating the operation button 310, in a non-volatile memory in the storage 103, and causes the display panel 120 to display the still image. In the case where the shooting mode of the electronic apparatus 1 is the video shooting mode, when touch panel 130 detects a predetermined operation (e.g., a tap operation) on the operation button 310, the controller 100 starts storing a video (a through image), which is taken with the camera being used, in the non-volatile memory in the storage 103. Subsequently, when the touch panel 130 detects a predetermined operation on the operation button 310, the controller 100 stops storing a video, which is taken with the camera being used, in the non-volatile memory in the storage 103.

Figure 8:
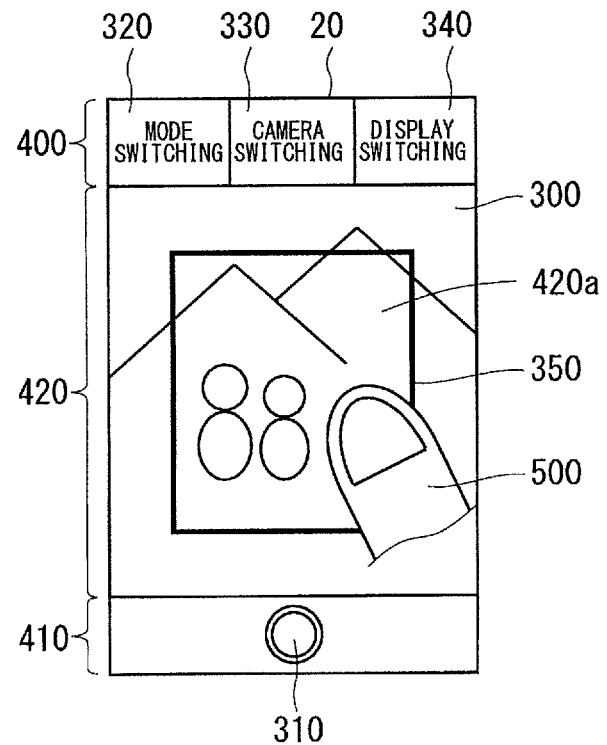
FIG. 8 A drawing showing an example of a user operation on the display screen.

After Step s3, if the touch panel 130 detects, in Step s4, a predetermined operation (e.g., a tap operation) on a region 420a in the standard shooting range displayed on the display screen 20 in the display screen 20, that is to say, the region 420a in the standard shooting range frame 350 displayed on the display screen 20 in the display screen 20, the controller 100 switches the camera being used from the wide angle camera 150 to the standard camera 160 in Step s5. FIG. 8 is a drawing showing an example of a tap operation performed by a user on the region 420a in the standard shooting range frame 350 with his/her finger 500.

Figure 9:
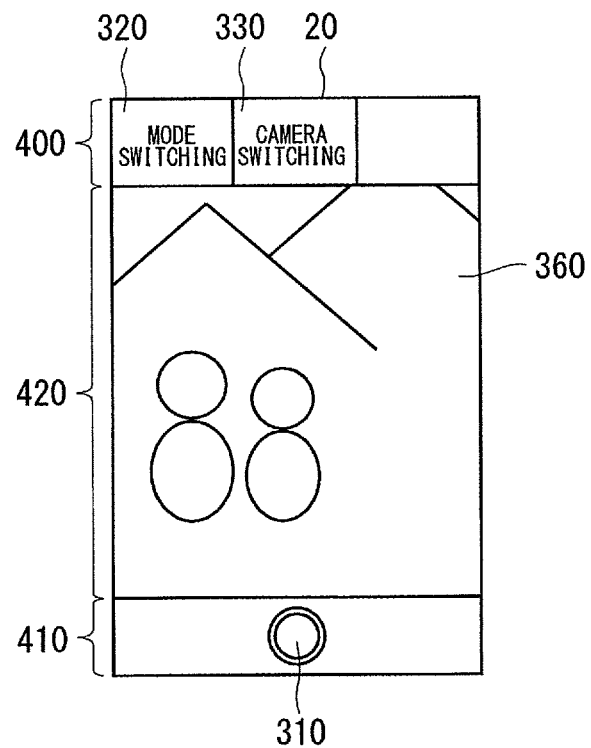
FIG. 9 A drawing showing an example of a display of the display screen.

When the camera being used is switched to the standard camera 160 in Step s5, the controller 100 causes the display panel 120 to display a through image (also referred to as "a standard through image" in some cases hereinafter) 360 taken with the standard camera 160 in Step s6. Thus, as shown in FIG. 9, the standard through image 360 is displayed in the central region 420 in the display screen 20.

Figure 10:
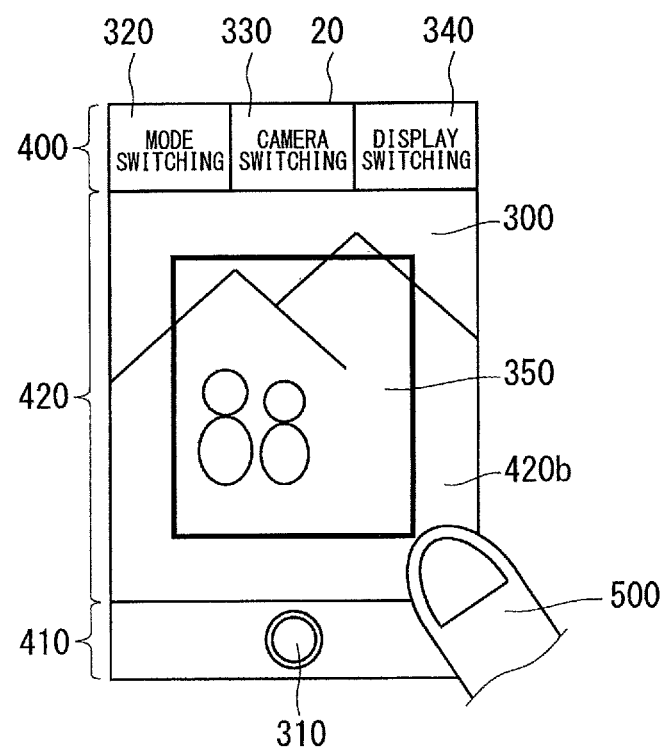
FIG. 10 A drawing showing an example of a user operation on the display screen.
Figure 11:
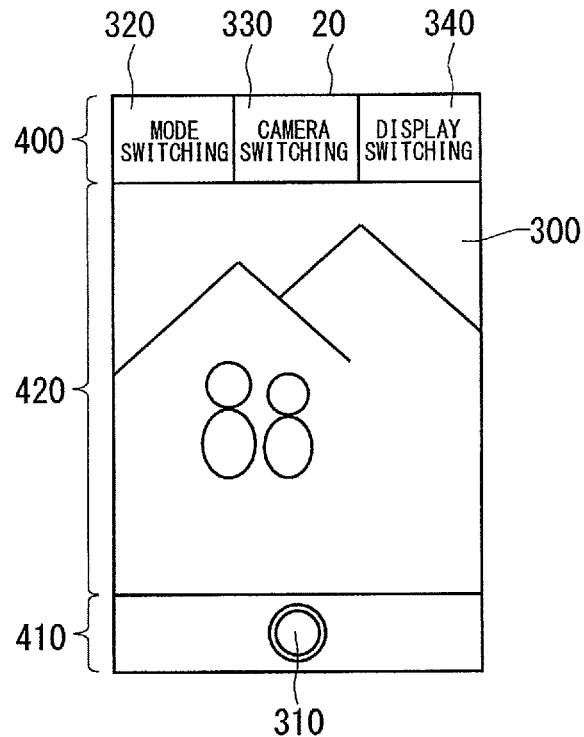
FIG. 11 A drawing showing an example of a display of the display screen.

In the meanwhile, after Step s3, if the touch panel 130 detects, in Step s7, a predetermined operation (e.g., a tap operation) on a region 420b out of the standard shooting range displayed on the display screen 20 in the display screen 20, that is to say, the region 420b out of the standard shooting range frame 350 displayed on the display screen 20 in the display screen 20 (refer to FIG. 10), the controller 100 causes the display panel 120 to delete the display of the standard shooting range, that is to say, the display of the standard shooting range frame 350 in Step s8. Thus, as shown in FIG. 11, the display of the standard shooting range frame 350 is deleted in the display screen 20. FIG. 10 shows an example of a tap operation performed by the user on the region 420b out of the standard shooting range frame 350 in the display screen 20 with his/her finger 500.

The display screen 20 displays the standard shooting range overlapping with the through image taken with the wide angle camera 150 also in case where the camera switching button 330 is operated and then the wide angle camera 150 is set to the camera being used, in other words, when the camera switching button 330 is operated and then the wide angle camera 150 is activated.

As described above, the standard shooting range is displayed to overlap with the through image taken with the wide angle camera 150 in the electronic apparatus 1. Accordingly, the user can confirm both the object whose image is taken with the wide angle camera 150 and the object whose image is taken with the standard camera 160 at the same time. Accordingly, the user can determine the camera used for shooting after confirming both the object whose image is taken with the wide angle camera 150 and the object whose image is taken with the standard camera 160 at the same time. As a result, the user can easily cause the electronic apparatus 1 to execute the desired type of shooting, thus the shooting image desired by the user can be easily obtained.

The user can confirm both the object whose image is taken with the wide angle camera 150 and the object whose image is taken with the standard camera 160 without performing the operation of switching the camera being used on the electronic apparatus 1. Accordingly, operability of the electronic apparatus 1 is enhanced.

The user can cause the electronic apparatus 1 to switch the camera being used from the wide angle camera 150 to the standard camera 160 by performing the operation on the region in the standard shooting range displayed on the display screen 20 in the display screen 20. Accordingly, the user can easily cause the electronic apparatus 1 to switch the camera being used to the standard camera 160.

The user can cause the electronic apparatus 1 to delete the display of the standard shooting range by performing the operation on the region out of the standard shooting range displayed on the display screen 20 in the display screen 20. Accordingly, the user can easily cause the electronic apparatus 1 to delete the display of the standard shooting range.

Figure 12:
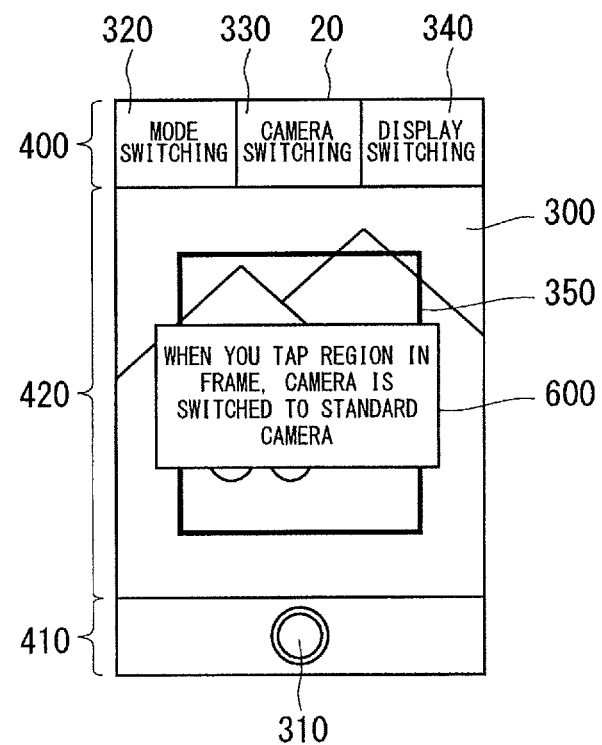
FIG. 12 A drawing showing an example of a display of the display screen.

It is also applicable to display a message 600 informing the user that the camera being used is switched from the wide angle camera 150 to the standard camera 160 by performing a predetermined operation on the region in the standard shooting range displayed on the display screen 20 in the display screen 20. FIG. 12 is a drawing showing an example of a display of the message 600. The message 600 is displayed for a certain period of time after the wide angle camera 150 is activated, and subsequently deleted.

In the example described above, the wide angle camera 150 is activated when the execution of the camera application starts, however, the standard camera 160 may also be activated, or the in-camera 170 may also be activated. In the above case, the display screen 20 displays the standard shooting range when the user operates the camera switching button 330 to set the camera being used to the wide angle camera 150.

The display switching button 340 needs not be displayed even when the display screen 20 displays the wide angle through image 300. That is to say, the display switching button 340 needs not be displayed constantly.

Figure 13:
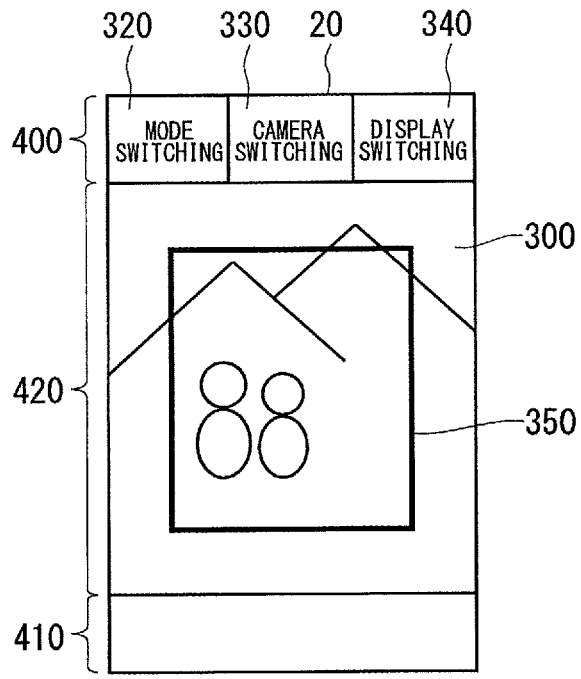
FIG. 13 A drawing showing an example of a display of the display screen.

When the display screen 20 displays the standard shooting range, the display screen 20 needs not display the operation button 310 as shown in FIG. 13. In the above case, when the user performs a predetermined operation on the region out of the standard shooting range displayed on the display screen 20 in the display screen 20 (refer to FIG. 10), the display screen 20 deletes the display of the standard shooting range and displays the operation button 310 (refer to FIG. 11). When the display screen 20 does not display the standard shooting range, the display screen 20 displays the operation button 310.

When the electronic apparatus 1 has an auto focus function for the camera being used, the user may perform a predetermined operation on the display screen 20 which displays the through image taken with the camera being used, thereby specifying the position on which the camera being used focuses. Specifically, when the user performs an operation of specifying the position of focusing the camera being used (e.g., a tap operation) on the central region 420 in the display screen 20 which displays the through image taken with the camera being used, the controller 100 defines the object indicated in a position on which the operation has been performed as a subject on which the camera being used is focused. Then, the controller 100 executes an auto focus processing of focusing the camera being used on the subject. The operation of specifying the position of focusing the camera being used (also referred to as "the position specifying operation" in some cases hereinafter) can be referred to as an operation of specifying a subject on which the camera being used is focused (also referred to as "the subject of focus" in some cases hereinafter). In a case where the display screen 20 displays the standard shooting range, when the position specifying operation is performed on the region out of the standard shooting range displayed on the display screen 20 in the display screen 20, the auto focus processing according to the position specifying operation is executed, and the display of the standard shooting range is deleted. In a case where the display screen 20 displays the standard shooting range, when the position specifying operation is performed on the region in the standard shooting range displayed on the display screen 20 in the display screen 20, the camera being used is switched from the wide angle camera 150 to the standard camera 160. At this time, the controller 100 switches the camera being used to the standard camera 160, and then executes the auto focus processing of focusing the standard camera 160 on the subject of focus specified in the position specifying operation in the case where the camera being used is the wide angle camera 150 among objects displayed in the central region 420 in which the through image taken with the standard camera 160 is displayed.

Various Modification Examples

The various modification examples are described hereinafter.

<Timing of Displaying Standard Shooting Range>

In the example described above, the controller 100 causes the display panel 120 to display the standard shooting range at the time of activating the wide angle camera 150, however, the controller 100 may also cause the display panel 120 to display the standard shooting range when a predetermined condition is satisfied after activating the wide angle camera 150. The various modification examples in the above case are described hereinafter.

First Modification Example

Figure 14:
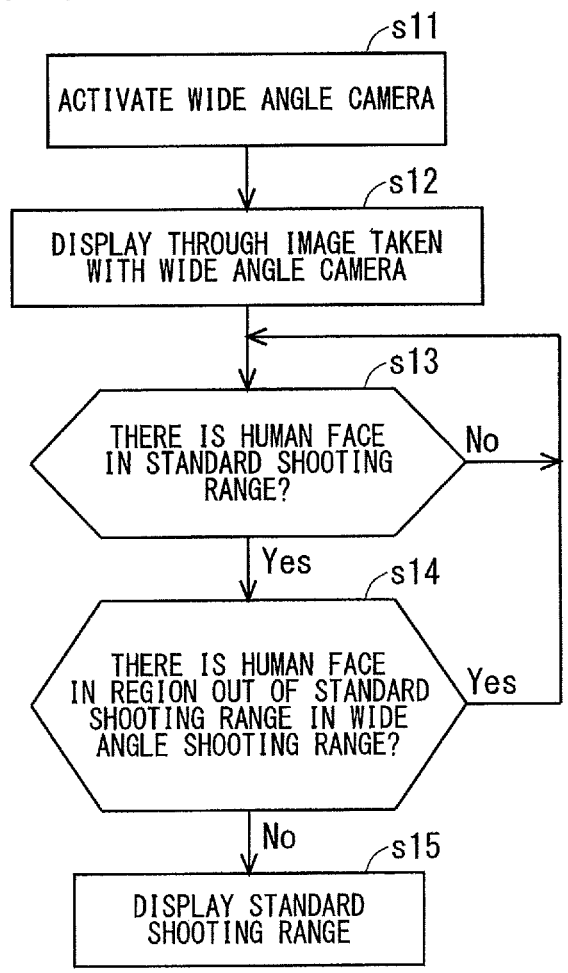
FIG. 14 A flow chart showing an example of an operation of the electronic apparatus.

In the present modification example, the controller 100 causes the display panel 120 to display the standard shooting range when there is a human face in the standard shooting range and there is no human face in the region out of the standard shooting range in the wide angle shooting range after activating the wide angle camera 150. FIG. 14 is a flow chart showing an example of an operation of the electronic apparatus 1 according to the present modification example.

When the wide angle camera 150 is activated in Step s11 due to the start of the execution of the camera application or the operation of the camera switching button 330, the controller 100 causes the display panel 120 to display the through image taken with the wide angle camera 150 in Step s12. At this time, the display panel 120 does not display the standard shooting range.

Next, in Step s13, the controller 100 determines whether or not there is the human face in the standard shooting range. At this time, the controller 100 determines whether or not there is the human face in the standard shooting range based on the shooting image taken with the wide angle camera 150. Specifically, the controller 100 extracts a partial image in which the object in the standard shooting range is included from the shooting image taken with the wide angle camera 150. Since the controller 100 recognizes which part of the wide angle shooting range corresponds to the standard shooting range, the controller 100 can extract the partial image in which the object in the standard shooting range is included from the shooting image taken with the wide angle camera 150. Then, the controller 100 determines whether or not the extracted partial image includes a face image indicating the human face. The controller 100 determines that there is the human face in the standard shooting range if the extracted partial image includes the face image indicating the human face. In the meanwhile, the controller 100 determines that there is no human face in the standard shooting range if the extracted partial image does not include the face image indicating the human face. The controller 100 executes Step s13 repeatedly until the controller 100 determines that there is the human face in the standard shooting range.

If the controller 100 determines that there is the human face in the standard shooting range in Step s13, the controller 100 determines whether or not there is the human face in the region out of the standard shooting range in the wide angle shooting range in Step s14. At this time, the controller 100 determines whether or not there is the human face in the region out of the standard shooting range in the wide angle shooting range based on the shooting image taken with the wide angle camera 150. Specifically, the controller 100 extracts a partial image in which the object in the region out of the standard shooting range is included in the wide angle shooting range from the shooting image taken with the wide angle camera 150. Then, the controller 100 determines whether or not the extracted partial image includes the face image indicating the human face. The controller 100 determines that there is the human face in the region out of the standard shooting range in the wide angle shooting range if the extracted partial image includes the face image indicating the human face. In the meanwhile, the controller 100 determines that there is no human face in the region out of the standard shooting range in the wide angle shooting range if the extracted partial image does not include the face image indicating the human face.

Figure 15:
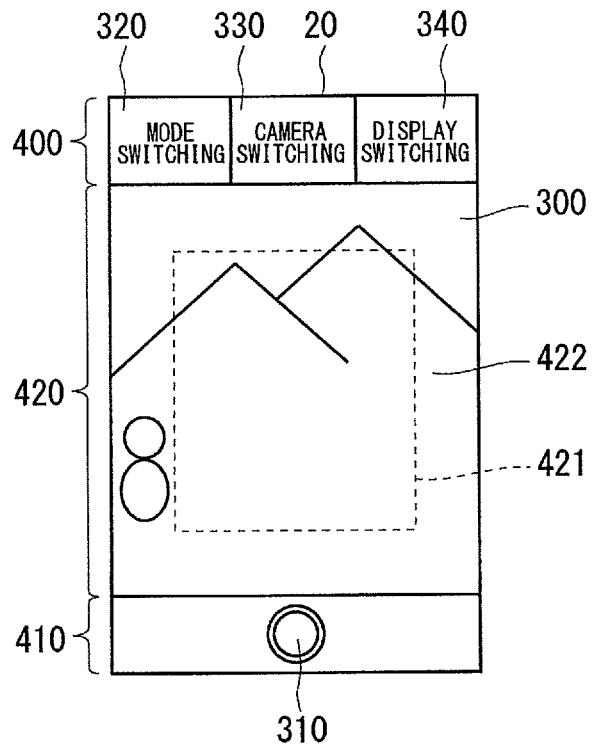
FIG. 15 A drawing showing an example of a display of the display screen.

If the controller 100 determines that there is the human face in the region out of the standard shooting range in the wide angle shooting range in Step s14, the controller 100 executes Step s13 described above. In the meanwhile, if the controller 100 determines that there is no human face in the region out of the standard shooting range in the wide angle shooting range in Step s14, the controller 100 displays the standard shooting range (the standard shooting range frame 350) overlapping with the wide angle through image 300 as shown in FIG. 7, for example, in Step s15. When the display screen 20 displays the standard shooting range, the human face is displayed only in the region 420a in the standard shooting range in the display screen 20 as the example of FIGS. 7 and 8. In the meanwhile, when the display screen 20 does not display the standard shooting range, the display screen 20 does not display the human face, or the human face is displayed only in a region 422 out of a region 421 in which the object in the standard shooting range is displayed in the display screen 20 as shown in FIG. 15.

After Step s15, when Step s4 described above is executed, Steps s5 and s6 are executed. After Step s15, when Step s7 is executed, Step s8 is executed.

As described above, in the present modification example, the standard shooting range is displayed if there is the human face in the standard shooting range and there is no human face in the region out of the standard shooting range in the wide angle shooting range. The above configuration can reduce a state where the user is bothered with the display of the standard shooting range which is constantly displayed.

Second Modification Example

Figure 16:
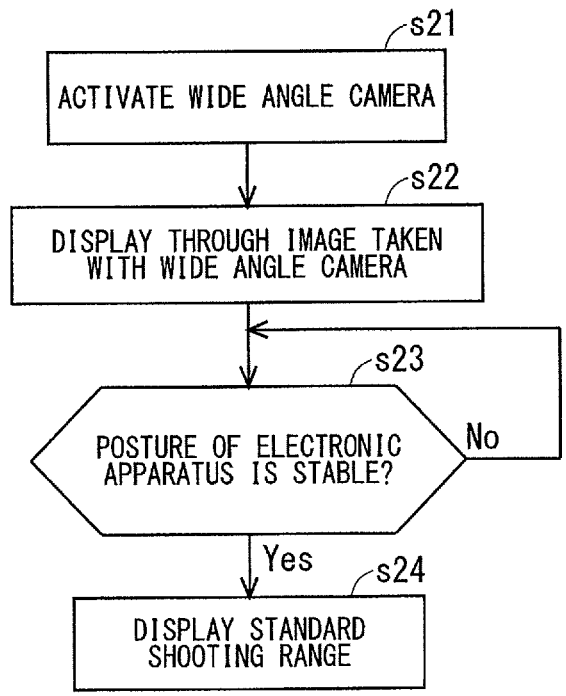
FIG. 16 A flow chart showing an example of an operation of the electronic apparatus.

In the present modification example, the controller 100 causes the display panel 120 to display the standard shooting range when the posture of the electronic apparatus 1 is stable after activating the wide angle camera 150. FIG. 16 is a flow chart showing an operation of the electronic apparatus 1 according to the present modification example.

When the wide angle camera 150 is activated in Step s21 due to the start of the execution of the camera application or the operation of the camera switching button 330, the controller 100 causes the display panel 120 to display the through image taken with the wide angle camera 150 in Step s22. At this time, the display panel 120 does not display the standard shooting range.

Next, in Step s23, the controller 100 determines whether or not the posture of the electronic apparatus 1 is stable. For example, the controller 100 determines whether or not the posture of the electronic apparatus 1 is stable based on the shooting image taken with the wide angle camera 150. Specifically, the controller 100 firstly compares a plurality of shooting images which are sequentially taken with the wide angle camera 150. If a difference between the plurality of shooting images is small, the controller 100 determines that the posture of the electronic apparatus 1 is stable. In the meanwhile, if the difference is not small, the controller 100 determines that the posture of the electronic apparatus 1 is not stable. The controller 100 executes Step s23 repeatedly until it determines that the posture of the electronic apparatus 1 is stable.

When the electronic apparatus 1 includes an acceleration sensor, the controller 100 may determine whether or not the posture of the electronic apparatus 1 is stable based on an output signal of the acceleration sensor. In the above case, the controller 100 obtains a variation of the output signal of the acceleration sensor, for example. Then, if the obtained variation is equal to or smaller than a threshold value, the controller 100 determines that the posture of the electronic apparatus 1 is stable. In the meanwhile, if the obtained variation is larger than the threshold value, the controller 100 determines that the posture of the electronic apparatus 1 is not stable.

If the controller 100 determines that the posture of the electronic apparatus 1 is stable in Step s23, the controller 100 displays the standard shooting range (the standard shooting range frame 350) overlapping with the wide angle through image 300 as shown in FIG. 7, for example, in Step s24.

As described above, in the present modification example, the standard shooting range is displayed if the posture of the electronic apparatus 1 is stable. Thus, the electronic apparatus 1 can display the standard shooting range on the display screen 20 if the subject to be shot is determined, in other words, if a composition of the shooting is determined. The above configuration can reduce the state where the user is bothered with the display of the standard shooting range which is constantly displayed.

Figure 17:
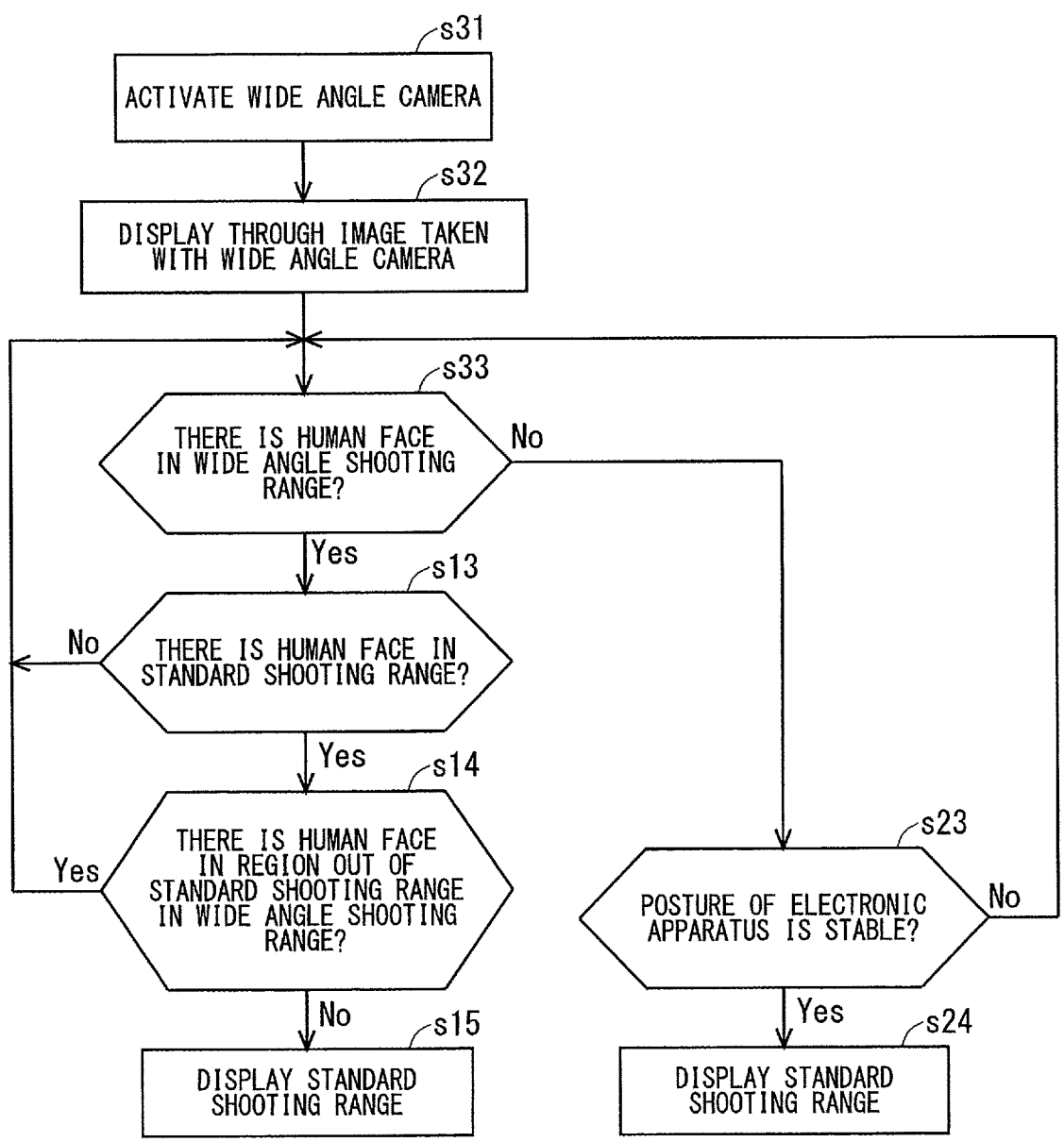
FIG. 17 A flow chart showing an example of an operation of the electronic apparatus.

The controller 100 may execute Step s13 and the subsequent steps described above if there is the human face in the wide angle shooting range, and execute Step s23 and the subsequent steps if there is no human face in the wide angle shooting range. FIG. 17 is a flow chart showing an operation of the electronic apparatus 1 in the above case.

As shown in FIG. 17, when the wide angle camera 150 is activated in Step s31, the controller 100 causes the display panel 120 to display the through image taken with the wide angle camera 150 in Step s32. At this time, the display panel 120 does not display the standard shooting range.

Next, in Step s33, the controller 100 determines whether or not there is the human face in the wide angle shooting range. At this time, the controller 100 determines whether or not there is the human face in the wide angle shooting range based on the shooting image taken with the wide angle camera 150. Specifically, the controller 100 determines whether or not the shooting image taken with the wide angle camera 150 includes a face image indicating the human face. The controller 100 determines that there is the human face in the wide angle shooting range if the shooting image taken with the wide angle camera 150 includes the face image indicating the human face. In the meanwhile, the controller 100 determines that there is no human face in the wide angle shooting range if the shooting image taken with the wide angle camera 150 does not include the face image indicating the human face.

If the controller 100 determines that there is the human face in the shooting image taken with the wide angle camera 150 in Step s33, the controller 100 executes the processing of Step s13 and the subsequent steps described above. In the present example, Step s33 is executed if the determination in Step s13 is No and the determination in Step s14 is Yes. In the meanwhile, if the controller 100 determines that there is no human face in the shooting image taken with the wide angle camera 150 in Step s33, the controller 100 executes the processing of Step s23 and the subsequent steps described above. In the present example, Step s33 is executed if the determination in Step s23 is No.

Third Modification Example

Figure 18:
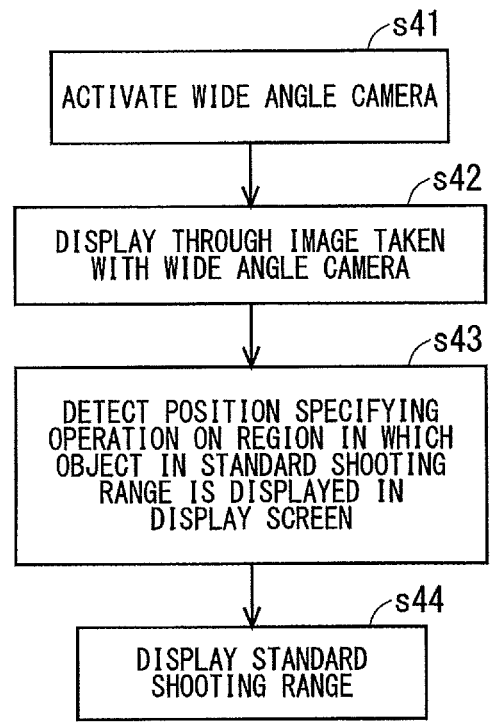
FIG. 18 A flow chart showing an example of an operation of the electronic apparatus.

In the present modification example, the controller 100 displays the standard shooting range when the position specifying operation of specifying the position of focusing the camera on the region 421 (refer to FIG. 15) in which the object in the standard shooting range is displayed in the display screen 20 after activating the wide angle camera 150. FIG. 18 is a flow chart showing an operation of the electronic apparatus 1 according to the present modification example.

When the wide angle camera 150 is activated in Step s41 due to the start of the execution of the camera application or the operation of the camera switching button 330, the controller 100 causes the display panel 120 to display the through image taken with the wide angle camera 150 in Step s42. At this time, the display panel 120 does not display the standard shooting range.

Figure 19:
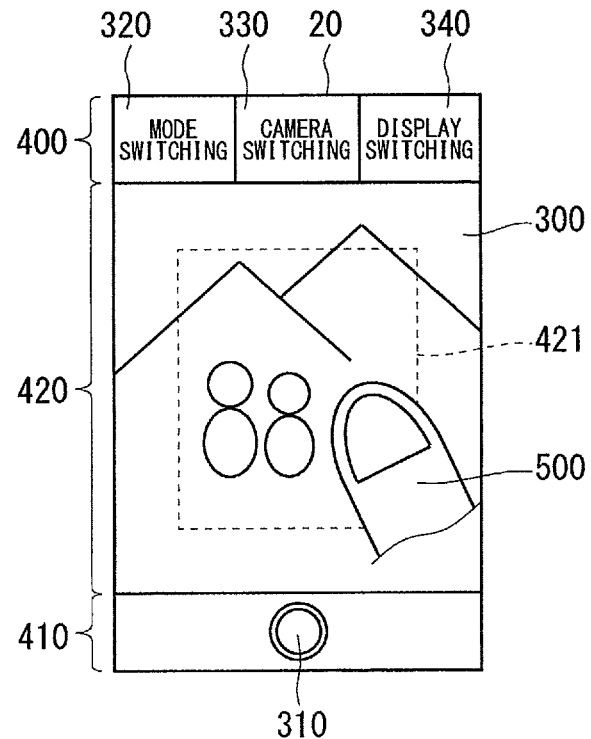
FIG. 19 A drawing showing an example of a user operation on the display screen.

Next, if the touch panel 130 detects the position specifying operation on the region 421 in which the object in the standard shooting range is displayed in the display screen 20 in Step s43, the controller 100 displays the standard shooting range (the standard shooting range frame 350) overlapping with the wide angle through image 300 as shown in FIG. 7, for example, in Step s44. FIG. 19 is a drawing showing an example of the position specifying operation performed by the user on the region 421 in which the object in the standard shooting range is displayed in the display screen 20 with the finger 500.

If the touch panel 130 detects the position specifying operation on the region 421 in Step s43, the controller 100 displays the standard shooting range on the display screen 20 and also executes an auto focus processing of focusing the wide angle camera 150 on an object displayed in a position where the position specifying operation is performed in the display screen 20. That is to say, the controller 100 executes the auto focus processing of focusing the wide angle camera 150 on a subject of focus specified in the position specifying operation among the objects in the wide angle shooting range displayed on the display screen 20. Accordingly, the wide angle camera 150 is focused on the position specified by the user in the through image 300 displayed on the display screen 20.

If the position specifying operation is performed on the region 422 (refer to FIGS. 15 and 19) out of the region 421 in which the object in the standard shooting range is displayed, the auto focus processing according to the position specifying operation is executed, however, the standard shooting range is not displayed.

When Steps s4 to s6 described above are executed after Steps s43 and s44, the controller 100 may execute the auto focus processing of focusing the standard camera 160 on the subject of focus, which is specified in the position specifying operation detected in Step s43, among the objects included in the standard through image displayed on the display screen 20. For example, if the user performs the position specifying operation to specify a person A included in the wide angle through image displayed on the display screen 20 in Step s43, the controller 100 focuses the standard camera 160 on the person A among the objects included in the standard through image displayed on the display screen 20 in the subsequent Step s6. Thus, the user needs not perform the position specifying operation again after the camera being used is switched from the wide angle camera 150 to the standard camera 160. Accordingly, operability of the electronic apparatus 1 is enhanced.

As described above, in the present modification example, the standard shooting range is displayed if the position specifying operation is performed on the region 421 in which the object in the standard shooting range is displayed in the display screen 20, thus the above configuration can reduce a state where the user is bothered with the display of the standard shooting range which is constantly displayed.

<Switching from Wide Angle Camera to Standard Camera>

In a case where the display screen 20 displays the wide angle through image, if a zoom-in operation of zooming in the object in the wide angle shooting range is performed on the electronic apparatus 1, the controller 100 may switch the camera being used from the wide angle camera 150 to the standard camera 160. FIG. 20 is a flow chart showing an operation of the electronic apparatus 1 according to the present modification example.

In a case where the display screen 20 displays the wide angle through image (Sep s51), if the touch panel 130 detects a zoom-in operation of zooming in the object in the wide angle shooting range on the display screen 20 in Step s52, the controller 100 determines a zoom magnification according to the detected zoom-in operation in Step s53. Then, in Step s54, the controller 100 determines whether or not the determined zoom magnification exceeds a threshold value. In the meanwhile, when the controller 100 determines the zoom magnification, the controller 100 zooms the object whose image is taken with the wide angle camera 150 at the determined zoom magnification. Accordingly, in the wide angle through image displayed on the display screen 20, the object in the wide angle shooting range is enlarged.

If the controller 100 determines that the zoom magnification exceeds the threshold value in Step s54, the controller 100 switches the camera being used from the wide angle camera 150 to the standard camera 160 in Step s55. In the meanwhile, if the controller 100 determines that the zoom magnification does not exceed the threshold value in Step s54, the controller 100 does not switch the camera being used. If the determination in Step s54 is No and then Step s52 is executed, the controller 100 operates in the similar manner subsequently.

The threshold value used in Step s54 can be determined based on a size of the wide angle shooting range at the time of setting the zoom magnification of the wide angle camera 150 to "one" and a size of the standard shooting range at the time of setting the zoom magnification of the standard camera 160 to "one", for example. Specifically, a ratio of the size of the wide angle shooting range at the time of setting the zoom magnification of the wide angle camera 150 to "one" to the size of the standard shooting range at the time of setting the zoom magnification of the standard camera 160 to "one" can be defined as the threshold value used in Step s54, for example. For example, when the size of the wide angle shooting range at the time of setting the zoom magnification of the wide angle camera 150 to "one" is half again the size of the standard shooting range at the time of setting the zoom magnification of the standard camera 160 to "one", the threshold value used in Step s54 is increased by half. Another method may also be applied in determining the threshold value.

Figure 21:
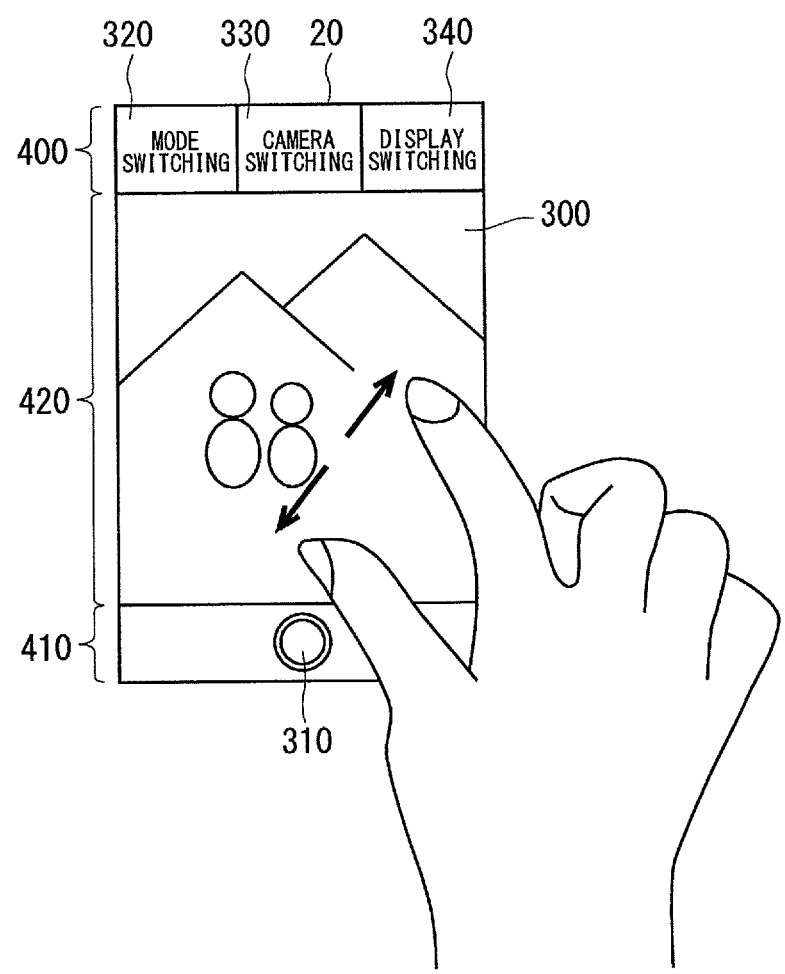
FIG. 21 A drawing showing an example of a user operation on the display screen.

A pinch-out operation, for example, is adoptable as the zoom-in operation for zooming in an object in a shooting range of a camera being used. FIG. 21 is a drawing showing the pinch-out operation as the zoom-in operation on the central region 420 in which the wide angle through image 300 is displayed in the display screen 20. As shown in FIG. 21, the pinch-out operation indicates an operation of moving two fingers (for example, a thumb and an index finger) away from each other (opening the two fingers) in a state where the two fingers are in contact with or close to the display screen 20. A zoom magnification in the zoom-in operation is determined by a distance between the two fingers moving away from each other (an angle between the two fingers which are being opened) in the pinch-out operation. The zoom magnification gets larger as the two fingers which perform the pinch-out operation move away from each other.

A pinch-in operation, for example, is adoptable as a zoom-out operation for zooming out an object in a shooting range of a camera being used. FIG. 22 is a drawing showing the pinch-in operation as the zoom-out operation on the central region 420 in which the wide angle through image 300 is displayed in the display screen 20. As shown in FIG. 22, the pinch-in operation indicates an operation of approaching the two fingers each other (closing the two fingers) in the state where the two fingers are in contact with or close to the display screen 20. A zoom magnification in the zoom-out operation is determined by a distance between the two fingers approaching each other (an angle between the two fingers which are being closed) in the pinch-in operation. The zoom magnification gets smaller as the two fingers which perform the pinch-in operation approach each other.

In the example in FIG. 20, the controller 100 switches the camera being used from the wide angle camera 150 to the standard camera 160 if the zoom magnification exceeds the threshold value, however, the controller 100 may also switch the camera being used from the wide angle camera 150 to the standard camera 160 regardless of the zoom magnification when the zoom-in operation is performed.

The controller 100 needs not execute Steps s54 and s55 when the display screen 20 displays the standard shooting range as shown in FIG. 7, for example, described above.

As described above, according to the present modification example, in the case where the display screen 20 displays the wide angle through image, if the zoom-in operation of zooming in the object in the wide angle shooting range is performed on the electronic apparatus 1, the camera being used is switched from the wide angle camera 150 to the standard camera 160. Accordingly, the user can easily cause the electronic apparatus 1 to switch the camera being used from the wide angle camera 150 to the standard camera 160. Accordingly, operability of the electronic apparatus 1 is enhanced.

<Switching from Standard Camera to Wide Angle Camera>

Figure 23:
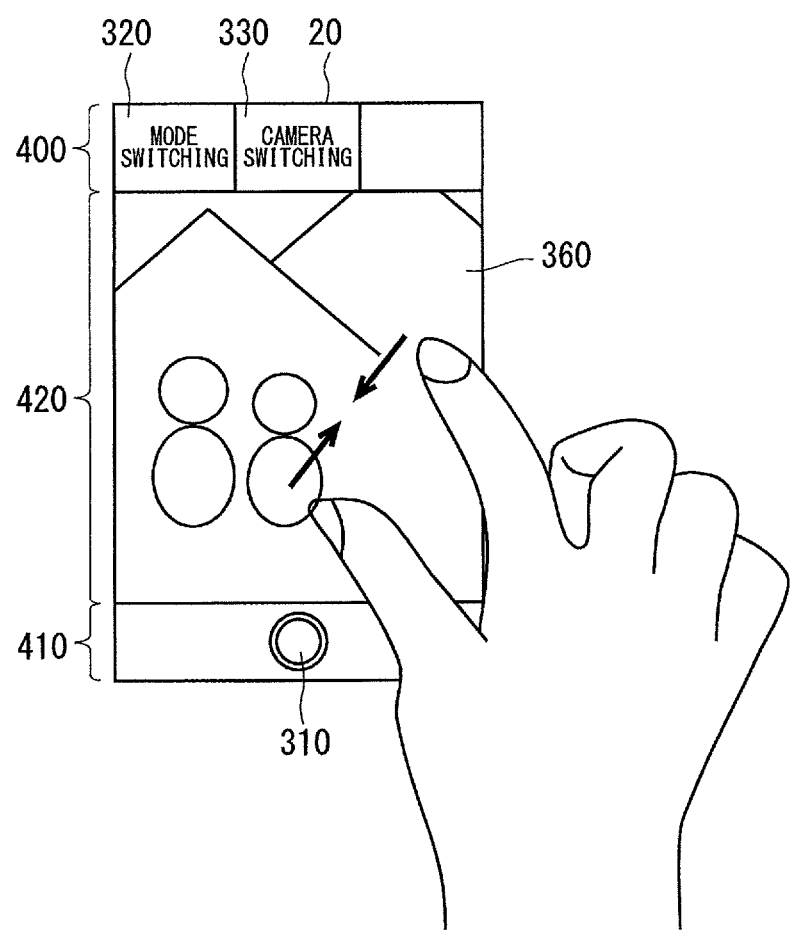
FIG. 23 A drawing showing an example of a user operation on the display screen.

In a case where the display screen 20 displays the standard through image 360 and the zoom magnification of the standard camera 160 is "one", if the zoom-out operation of zooming out the object in the standard shooting range is performed, the controller 100 may switch the camera being used from the standard camera 160 to the wide angle camera 150. Accordingly, the user can easily cause the electronic apparatus 1 to switch the camera being used from the standard camera 160 to the wide angle camera 150. Accordingly, operability of the electronic apparatus 1 is enhanced. FIG. 23 is a drawing showing the pinch-in operation as the zoom-out operation on the central region 420 in which the standard through image 360 is displayed in the display screen 20.

In the examples described above, the electronic apparatus 1 is a mobile phone such as a smartphone, however, the electronic apparatus 1 may be an apparatus other than the mobile phone. For example, the electronic apparatus 1 may be a tablet terminal or a personal computer.

As described above, the electronic apparatus 1 has been described in detail, but the above-mentioned description is illustrative in all aspects and the present disclosure is not intended to be limited thereto. The above modification examples may be applied in combination in so far as they are mutually consistent. Various modification examples not exemplified are construed to be made without departing from the scope of the present disclosure.

EXPLANATION OF REFERENCE SIGNS 1 electronic apparatus
20 display screen
100 controller
120 display panel
130 touch panel
150 first camera (wide angle camera)
160 second camera (standard camera)

The invention claimed is:

1. An electronic apparatus, comprising:
first and second cameras configured to be able to be switched and used;
at least one processor configured to determine one of the first and second cameras as a camera being used; and
a display configured to display a shooting image of each of the first and second cameras, wherein
the first camera is a camera which can take an image at a wider angle than the second camera,
the first camera has a first shooting range,
the second camera has a second shooting range, and
when the display displays a first through image taken with the first camera as the camera being used, the display displays the second shooting range overlapping with the first through image, wherein
if a first operation is performed on a region out of the second shooting range displayed on the display screen in the display screen of the display, the display deletes a display of the second shooting range.

2. The electronic apparatus according to claim 1, wherein
if a second operation is performed on a region in the second shooting range displayed on a display screen in the display screen of the display, the at least one processor switches the camera being used from the first camera to the second camera.

3. The electronic apparatus according to claim 2, wherein the second operation includes an operation of specifying a position on which the camera being used is focused.

4. The electronic apparatus according to claim 1, wherein the first operation includes an operation of specifying a position on which the camera being used is focused.

5. The electronic apparatus according to claim 1, wherein
the at least one processor performs a first determination of determining whether or not there is a human face in the second shooting range and a second determination of determining whether or not there is a human face in a region out of the second shooting range in the first shooting range when the display displays the first through image, and
in the case where the display displays the first through image, if the at least one processor determines that there is a human face in the second shooting range and there is no human face in the region out of the second shooting region in the first shooting range, the display displays the second shooting range overlapping with the first through image.

6. The electronic apparatus according to claim 1, wherein
the at least one processor determines whether or not a posture of the electronic apparatus is stable when the display displays the first through image, and
in the case where the display displays the first through image, if the at least one processor determines that the posture is stable, the display displays the second shooting range overlapping with the first through image.

7. The electronic apparatus according to claim 1, wherein
in the case where the display displays the first through image, if an operation of specifying a position on which the camera being used is focused is performed on a region in which an object in the second shooting range is displayed in the display screen of the display, the display displays the second shooting range overlapping with the first through image.

8. The electronic apparatus according to claim 1, wherein
when the display displays the first through image, the display displays a switching button for switching display/non-display of the second shooting range.

9. The electronic apparatus according to claim 1, wherein
the electronic apparatus has a function of zooming a first object whose image is taken with the first camera, and
in the case where the display displays the first through image, if a zoom-in operation of zooming in the first object is performed on the electronic apparatus, the at least one processor switches the camera being used from the first camera to the second camera.

10. The electronic apparatus according to claim 1, wherein
the electronic apparatus has a function of zooming a second object whose image is taken with the second camera, and
in a case where the display displays a second through image taken with the second camera as the camera being used and a zoom magnification of the second camera is "one", if a zoom-out operation of zooming out the second object is performed on the electronic apparatus, the at least one processor switches the camera being used from the second camera to the first camera.

11. A method of operating an electronic apparatus which is a camera including first and second cameras being able to be switched and used, the first camera can take an image at a wider angle than the second camera, comprising
displaying a through image taken with the first camera and a shooting range of the second camera so that the shooting range overlaps with the through image; and
if a first operation is performed on a region outside of the shooting range displayed on a display screen, deleting a display of the second shooting range.

12. A non-transitory computer-readable recording medium which stores control program for controlling an electronic apparatus which is a camera including first and second cameras being able to be switched and used, the first camera can take an image at a wider angle than the second camera, wherein
the control program causes the electronic apparatus to display a through image taken with the first camera and a shooting range of the second camera so that the shooting range overlaps with the through image; and
the control program further causes the electronic apparatus, in response to a first operation being performed on a region outside of the shooting range displayed on a display screen, to delete a display of the second shooting range.

\* \* \* \* \*